(12) United States Patent
Danoyan et al.

(10) Patent No.: US 8,219,807 B1
(45) Date of Patent: Jul. 10, 2012

(54) FINE GRAINED ACCESS CONTROL FOR LINUX SERVICES

(75) Inventors: Alexander Y. Danoyan, Riverton, UT (US); Scott A. Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 1261 days.

(21) Appl. No.: 11/115,818

(22) Filed: Apr. 26, 2005

Related U.S. Application Data

(60) Provisional application No. 60/636,946, filed on Dec. 17, 2004.

(51) Int. Cl.
*G06F 21/00* (2006.01)

(52) U.S. Cl. .......................................... 713/167; 726/28

(58) Field of Classification Search .......... 713/166–167, 713/182; 726/6–7, 26–29
See application file for complete search history.

(56) References Cited

U.S. PATENT DOCUMENTS

| | | | |
|---|---|---|---|
| 4,918,653 A | 4/1990 | Johri et al. | |
| 5,664,206 A | 9/1997 | Murow et al. | |
| 5,713,024 A | 1/1998 | Halladay | |
| 5,721,824 A | 2/1998 | Taylor | |
| 5,732,212 A | 3/1998 | Perholtz et al. | |
| 5,748,890 A | 5/1998 | Goldberg et al. | |
| 5,835,777 A | 11/1998 | Staelin | |
| 5,894,571 A | 4/1999 | O'Connor | |
| 5,901,227 A * | 5/1999 | Perlman | 713/157 |
| 5,950,010 A | 9/1999 | Hesse et al. | |
| 5,961,593 A * | 10/1999 | Gabber et al. | 709/219 |
| 6,144,959 A | 11/2000 | Anderson et al. | |
| 6,161,139 A * | 12/2000 | Win et al. | 709/225 |
| 6,205,579 B1 | 3/2001 | Southgate | |
| 6,256,774 B1 | 7/2001 | O'Leary et al. | |
| 6,259,442 B1 | 7/2001 | Britt et al. | |
| 6,282,711 B1 | 8/2001 | Halpern et al. | |
| 6,301,707 B1 | 10/2001 | Carroll et al. | |
| 6,324,691 B1 | 11/2001 | Gazdik | |
| 6,353,926 B1 | 3/2002 | Parthesarathy et al. | |
| 6,367,075 B1 | 4/2002 | Kruger et al. | |
| 6,421,777 B1 | 7/2002 | Pierre-Louis et al. | |
| 6,457,130 B2 | 9/2002 | Hitz et al. | |
| 6,460,060 B1 | 10/2002 | Maddalozzo et al. | |
| 6,493,871 B1 | 12/2002 | McGuire et al. | |
| 6,539,473 B1 | 3/2003 | Hubacher et al. | |
| 6,539,539 B1 | 3/2003 | Larsen et al. | |

(Continued)

FOREIGN PATENT DOCUMENTS

GB 2419711 5/2006

OTHER PUBLICATIONS

Tanenbaum, Andrew; Modern Operating Systems; 2nd ed.; 2001; Prentice Hall, Upper Saddle River, NJ; pp. 753-757.

(Continued)

*Primary Examiner* — Hadi Armouche
(74) *Attorney, Agent, or Firm* — Marger Johnson & McCollom PC

(57) ABSTRACT

A user requests to execute an application. The system authenticates the user and determines whether the user is authorized to execute the application. If the user is both authenticated and authorized to execute the application, the system grants the user permission to execute the application. Otherwise, the system denies the user permission to execute the application.

19 Claims, 8 Drawing Sheets

U.S. PATENT DOCUMENTS

| | | | |
|---|---|---|---|
| 6,606,744 B1 | 8/2003 | Mikurak | |
| 6,615,406 B1 | 9/2003 | Amberg et al. | |
| 6,651,085 B1 | 11/2003 | Woods | |
| 6,725,452 B1 | 4/2004 | Te'eni et al. | |
| 6,728,711 B2 | 4/2004 | Richard | |
| 6,735,757 B1 | 5/2004 | Kroening et al. | |
| 6,775,829 B1 | 8/2004 | Kroening | |
| 6,799,208 B1 | 9/2004 | Sankaranarayan et al. | |
| 6,892,382 B1 | 5/2005 | Hapner et al. | |
| 6,928,644 B1 | 8/2005 | Kroening et al. | |
| 6,981,028 B1 | 12/2005 | Rawat et al. | |
| 7,006,993 B1 | 2/2006 | Cheong et al. | |
| 7,013,461 B2 | 3/2006 | Hellerstein et al. | |
| 7,016,959 B2 | 3/2006 | Dinh et al. | |
| 7,051,327 B1 | 5/2006 | Milius et al. | |
| 7,055,149 B2 | 5/2006 | Birkholz et al. | |
| 7,093,247 B2 | 8/2006 | Ashworth et al. | |
| 7,143,067 B1 | 11/2006 | Cheston et al. | |
| 7,177,859 B2 | 2/2007 | Pather et al. | |
| 7,181,768 B1 | 2/2007 | Ghosh et al. | |
| 7,185,047 B1* | 2/2007 | Bate et al. | 709/202 |
| 7,222,218 B2 | 5/2007 | Dutt et al. | |
| 7,251,812 B1 | 7/2007 | Jhanwar et al. | |
| 7,272,815 B1 | 9/2007 | Eldridge et al. | |
| 7,284,243 B2 | 10/2007 | Burgess | |
| 7,302,634 B2* | 11/2007 | Lucovsky et al. | 715/200 |
| 7,350,075 B1* | 3/2008 | Eastham | 713/168 |
| 7,353,533 B2* | 4/2008 | Wright et al. | 726/1 |
| 7,356,679 B1 | 4/2008 | Le et al. | |
| 7,398,480 B2 | 7/2008 | Zimniewicz et al. | |
| 7,398,524 B2 | 7/2008 | Shapiro | |
| 7,424,617 B2 | 9/2008 | Boyd et al. | |
| 7,478,381 B2 | 1/2009 | Roberts et al. | |
| 7,506,337 B2 | 3/2009 | Iyer | |
| 7,506,338 B2 | 3/2009 | Alpern et al. | |
| 7,539,978 B1 | 5/2009 | Haddox et al. | |
| 7,546,594 B2 | 6/2009 | McGuire et al. | |
| 7,571,427 B2 | 8/2009 | Wang et al. | |
| 7,574,706 B2 | 8/2009 | Meulemans et al. | |
| 7,577,722 B1 | 8/2009 | Khandekar et al. | |
| 7,853,609 B2 | 12/2010 | Dehghan et al. | |
| 2001/0023440 A1 | 9/2001 | Franklin et al. | |
| 2001/0029605 A1 | 10/2001 | Forbes et al. | |
| 2002/0007330 A1 | 1/2002 | Kumar et al. | |
| 2002/0007380 A1 | 1/2002 | Bauchot et al. | |
| 2002/0010757 A1 | 1/2002 | Granik et al. | |
| 2002/0019879 A1 | 2/2002 | Jasen et al. | |
| 2002/0100036 A1 | 7/2002 | Moshir et al. | |
| 2002/0147974 A1 | 10/2002 | Wookey | |
| 2002/0156877 A1 | 10/2002 | Lu et al. | |
| 2002/0162030 A1* | 10/2002 | Brezak et al. | 713/202 |
| 2003/0014656 A1* | 1/2003 | Ault et al. | 713/200 |
| 2003/0037107 A1* | 2/2003 | Maeda | 709/203 |
| 2003/0061202 A1 | 3/2003 | Coleman | |
| 2003/0115292 A1 | 6/2003 | Griffin et al. | |
| 2003/0121024 A1 | 6/2003 | Hill et al. | |
| 2003/0126214 A1 | 7/2003 | Oliszewski | |
| 2003/0131073 A1* | 7/2003 | Lucovsky et al. | 709/219 |
| 2003/0149749 A1 | 8/2003 | Hetherington et al. | |
| 2003/0172127 A1 | 9/2003 | Northrup et al. | |
| 2003/0182414 A1 | 9/2003 | O'Neill | |
| 2003/0195970 A1 | 10/2003 | Dinh et al. | |
| 2003/0200149 A1 | 10/2003 | Gonzalez et al. | |
| 2003/0217123 A1 | 11/2003 | Anderson et al. | |
| 2003/0221190 A1 | 11/2003 | Deshpande et al. | |
| 2004/0003266 A1 | 1/2004 | Moshir et al. | |
| 2004/0006710 A1* | 1/2004 | Pollutro et al. | 713/201 |
| 2004/0015831 A1 | 1/2004 | Bowhill | |
| 2004/0015946 A1 | 1/2004 | Te'eni et al. | |
| 2004/0025048 A1 | 2/2004 | Porcari et al. | |
| 2004/0049697 A1 | 3/2004 | Edwards, Jr. et al. | |
| 2004/0102182 A1* | 5/2004 | Reith et al. | 455/410 |
| 2004/0196981 A1 | 10/2004 | Nakano et al. | |
| 2004/0205748 A1 | 10/2004 | Iyer | |
| 2004/0254976 A1 | 12/2004 | Malik et al. | |
| 2004/0255291 A1 | 12/2004 | Sierer et al. | |
| 2005/0002057 A1* | 1/2005 | Oe | 358/1.15 |
| 2005/0005152 A1 | 1/2005 | Singh et al. | |
| 2005/0081055 A1* | 4/2005 | Patrick et al. | 713/200 |
| 2005/0097353 A1* | 5/2005 | Patrick et al. | 713/200 |
| 2005/0120054 A1 | 6/2005 | Shulman et al. | |
| 2005/0125677 A1* | 6/2005 | Michaelides | 713/185 |
| 2005/0132179 A1 | 6/2005 | Glaum et al. | |
| 2005/0132349 A1 | 6/2005 | Roberts et al. | |
| 2005/0134896 A1* | 6/2005 | Koga | 358/1.14 |
| 2005/0144615 A1 | 6/2005 | Chen et al. | |
| 2005/0235248 A1 | 10/2005 | Victoria et al. | |
| 2005/0246588 A1 | 11/2005 | Deng et al. | |
| 2006/0021065 A1* | 1/2006 | Kamperman et al. | 726/28 |
| 2006/0047657 A1 | 3/2006 | Frieder et al. | |
| 2006/0059359 A1 | 3/2006 | Reasor et al. | |
| 2006/0090208 A1* | 4/2006 | Smith | 726/26 |
| 2006/0123101 A1 | 6/2006 | Buccella et al. | |
| 2006/0123414 A1 | 6/2006 | Fors et al. | |
| 2006/0137000 A1* | 6/2006 | Isaacson | 726/7 |
| 2006/0155838 A1 | 7/2006 | Wu et al. | |
| 2006/0174238 A1 | 8/2006 | Henseler et al. | |
| 2006/0212865 A1 | 9/2006 | Vincent et al. | |
| 2006/0218544 A1 | 9/2006 | Chakraborty et al. | |
| 2006/0230124 A1 | 10/2006 | Belfiore et al. | |
| 2006/0265597 A1 | 11/2006 | Carey et al. | |
| 2006/0277542 A1 | 12/2006 | Wipfel | |
| 2007/0006205 A1 | 1/2007 | Kennedy et al. | |
| 2007/0111726 A1 | 5/2007 | Lambert et al. | |

OTHER PUBLICATIONS

Cowan et al., Defcon Capture the Flag: Defending Vulnerable Code from Intense Attack, USA.

"A Third Phase of Internet Search"; http://getoutfoxed.com/book|print/46; printed on Aug. 28, 2007; p. 1-2.

"Abstract"; http://getoutfoxed.com/book|print/36; printed on Aug. 28, 2007; p. 1.

"Beyond Outfoxed"; http://getoutfoxed.com/book|print/88; printed on Aug. 28, 2007; p. 1.

"Calculating Levels of Trust"; http://getoutfoxed.com/book|print/112; printed on Aug. 28, 2007; pp. 1-2.

"Comparison to Existing Systems"; http://getoutfoxed.com/book|print/47; printed on Aug. 28, 2007; pp. 1-3.

"Files & Processes"; http://getoutfoxed.com/book|print/84; printed on Aug. 28, 2007; p. 1.

"Firefox Help: How to Manage Profiles"; http://www.mozilla.org/support|firefox|profile; printed on Aug. 27, 2007; pp. 1-4.

"How it Works"; http://getoutfoxed.com/book|print/87; printed on Aug. 28, 2007; p. 1.

"Keeping Your Network Clean"; http://getoutfoxed.com/book|print/108; printed on Aug. 28, 2007; p. 1.

"Novell ZENworks 7 Suite: Your Complete Identity-driven IT Resource Management Solution"; Novell, Inc. Product Guide; http://www.novell.com; (2006); pp. 1-11.

"Novell ZENworks Configuration Management: Complete Systems Management to Lower Your Total Cost of Ownership"; Novell, Inc. Product Guide; http://www.novell.com; (2007); pp. 1-11.

"Novell ZENworks Endpoint Security Management: Total Control from a Single Console"; Novell, Inc. Technical White Paper; http://www.novell.com; (2007); p. 1-11.

"Novell ZENworks Orchestrator Virtual Machine Management Guide 1.1 "; Novell, Inc.; http://www.novell.com; (2007); pp. 1-109.

"Novell ZENworks"; Wikipedia, the free encyclopedia; http://en.wikipedia.org/wiki/ZENworks; Printed on Aug. 28, 2007; pp. 1-3.

"Objections"; http://getoutfoxed.com/book|print/35; printed on Aug. 28, 2007; p. 1.

"Objections"; http://getoutfoxed.com/book|print/86; printed on Aug. 28, 2007; p. 1.

"Orchestrating the Data Center with Novell ZENworks"; Novell Solution Flyer; http://www.novell.com; (2007), pp. 1-4.

Tridgell, A. et al., "The rsync algorithm," retrieved at http://www.samba.org/rsync/tech_report/node2.html, Nov. 9, 1998, p. 1.

"Phishing, Spyware, Crapware, Adware"; http://getoutfoxed.com/book|print/85; printed on Aug. 28, 2007; p. 1.

"Search & Browsing"; http://getoutfoxed.com/book|print/83; printed on Aug. 28, 2007; p. 1.

"Small World Networks"; http://getoutfoxed.com/book|print/62; printed on Aug. 28, 2007; pp. 1-2.
"Socially Aware Surfing and Shopping"; http://getoutfoxed.com/book|print/73; printed on Aug. 28, 2007; p. 1.
"Tagging and Folksonomy"; http://getoutfoxed.com/book|print/96; printed on Aug. 28, 2007; p. 1.
"Three Magic Ingredients"; http://getoutfoxed.com/book|print/32; printed on Aug. 28, 2007; p. 1.
"What Outfoxed is Not"; http://getoutfoxed.com/book|print/34; printed on Aug. 28, 2007; p. 1.
"XenFaq—Xen Wiki"; http://www.wiki.xensource.com/xenwiki/XenFaq; printed on Aug. 27, 2007; pp. 1-7.
Adorno, Kerry, "Novell Delivers Industry's Most Comprehensive Systems Management Solution"; Novell, Inc.; http://www.novell.com/news/press/novell-delivers-industrys-most-comprehensive-systems-management-solution; Waltham, Massachusetts; Aug. 14, 2007; p. 1.
Aiken, Peter et al., Microsoft Computer Dictionary; Fifth Edition; Microsoft Press; 2002.
Bailey, E.C., Maximum RPM, Red Hat Inc., 2000, ISBN 1-888172-78-9, http://www.redhat.com/docs/books/max-rpm/index.html, pp. 1-565.
Buytaert, Kris, "Linux Virtualization with Xen"; LinuxDevCenter.com; http://www.linuxdevcenter.com/pub/a/linux|2006/01|26/xen.html; Jan. 26, 2006; pp. 1-3.
Clark, Bryan, "A Moment of Xen: Virtualize Linux to Test Your Apps"; IBM.com; http://www-128.ibm.com/ developerworks/linux|library/I-xen/; Mar. 15, 2005; pp. 1-6.
Fusco, John, "The Linux Programmer's Toolbox", Prentice Hall; 2007; Chapter 5, "What Every Developer Should Know about the Kernel," pp. 222-224.
James, Stan; "Outfoxed in a Nutshell"; http://getoutfoxed.com/nutshell; printed on Aug. 28, 2007; pp. 1-3.
James, Stan; "Outfoxed in a Nutshell: What does Outfoxed add to my Browser?"; http://getoutfoxed.com/nutshell/ node/106; printed on Aug. 28, 2007; pp. 1-3.
James, Stan; "What is Outfoxed?"; http://getoutfoxed.com/about; printed on Aug. 28, 2007; pp. 1-2.
Newham, C. et al., "Learning the Bash Shell," 2nd Ed., O'Reilly & Associates, 1998, p. 13.

Nemeth, Evi et al., "Linux Administration Handbook"; Prentice Hall; 2006; Chapter 12—TCP/IP Networking, pp. 276-277.
Silva, G.N., APT HOWTO, Chapter 5—Getting Information about packages, Aug. 2001, http://web.archive.org/web/20010911133902/http://www.debian.org/doc/manuals/apt-howto/ch-sourcehandling.en.html.
Silva, G.N., APT HOWTO, Chapter 6—Working with source packages, Aug. 2001, http://web.archive.org/web/20010911133902/http://www.debian.org/doc/manuals/apt-howto/ch-sourcehandling.en.html.
Rosen, Rami, "Introduction to the Xen Virtual Machine"; LinuxJournal.com; http://www.linuxjournal.com/article/8540; Sep. 1, 2005; pp. 1-10.
Tanenbaum, Andrew S., "Computer Networks"; Third edition; Prentice Hall; 1996; pp. 29, 44.
Bhuta et al., "A framework for identification and resolution of interoperability mismatchs in COTS based system", IEEE IWICSS, 2007, pp. 1-6.
Chapman et al., "Contemplating systemic software reuse in project centric company", ACM SAICSIT, 2008, pp. 16-26.
Gill et al., "Resuability issued in component based development", ACM, 2003, pp. 1-5.
Lymer et al., "Experience in using business scenarios to access COTS components in integrated solutions", ACM, 2005, pp. 1-15.
YourDictionary.com, Remote boot, retrieved on Jan. 5, 2010 from https:///www.yourdictionary.com/computer/remote-boot.
Tanenbaum, Andrew; "Modern Operating Systems"; Second edition; Prentice Hall, Upper Saddle River, NJ; 2001; pp. 753-757.
Stephanie Forrest, Computer Immunnology, Oct. 1997, ACm, 88-96.
Garfinkel et al., Practical Unix & Internet Security, ISBN 1-56592-148-8, Chpt. 3.1, 3.2, 4.1, 4.2, Second Ed., Apr. 1996.
Cowan, et al., Immunix & Defcon: Defending Vulnerable Code From Intense Attack; 2003, Immunix, USA.
Cowan et al., SubDomain: Parsimonious Server Security; Proceeding of the 14th Systems Administration Conference; 2000, The Usenix Association, USA.
Cowan et al. Defcon Capture the Flag: Defending Vulnerable Code from Intense Attack, USA, Apr. 22, 2003, Proceedings DARPA Information Survivability Conference and Exposition, vol. 1, pp. 120-129.

* cited by examiner

FINE GRAINED ACCESS CONTROL FOR LINUX SERVICES

RELATED APPLICATION DATA

This application claims priority from commonly-assigned U.S. Provisional Patent Application Ser. No. 60/636,946, titled "Fine Grained Access Control for Linux Services", filed Dec. 17, 2004, which is hereby incorporated by reference.

FIELD OF THE INVENTION

This invention pertains to application execution, and more particularly to allowing users to execute an application based on the application requested.

BACKGROUND OF THE INVENTION

Traditional computer operating systems are designed to recognize different levels of authority to use the computer. A typical computer operating system recognizes two such levels. The first level, which can be called the root or administrator level, allows the user to make any changes he or she wants to the computer. Changes that affect multiple users are typically reserved to administrative users, because of the potential to impact multiple users in a negative manner. For example, administrative users are typically reserved the right to install device drivers, and to configure accounts for new users. The second level is the level assigned to most typical users. These users are limited in what they can do. Essentially, regular users can make changes that affect their personal files, including granting other users access to their files, but otherwise cannot make changes. Depending on the operating system, some computers recognize other intermediate levels, which grant some users rights that are similar to administrative rights, but are not as broad in scope (or are more limited in number).

While this structure generally works very well, it does have limitations. For example, sometimes it is desirable to let users have control over particular applications as if they were administrative users, but limit their control over other applications. With the structure described above, this level of control is not possible. If a user is an administrative user, they can access every application just like any other administrative user; if a user is a limited user, they can access every application only to the extent other limited users can do so.

Accordingly, a need remains for a way to give users levels of access to application that depends on the application, to address these and other problems associated with the prior art.

SUMMARY OF THE INVENTION

The invention is a method and apparatus for performing authentication of users. When a user requests to execute an application, the system attempts to authenticate the user. Assuming the user is successfully authenticated, the system determines if the user is authorized to execute the application. This authorization can be determined in different ways, as desired. For example, the system can include a blacklist of users or groups that are to be denied permission to execute the application. Then, even if the user is authenticated, if the user is not authorized to execute the application, the system denies the user permission to execute the application.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
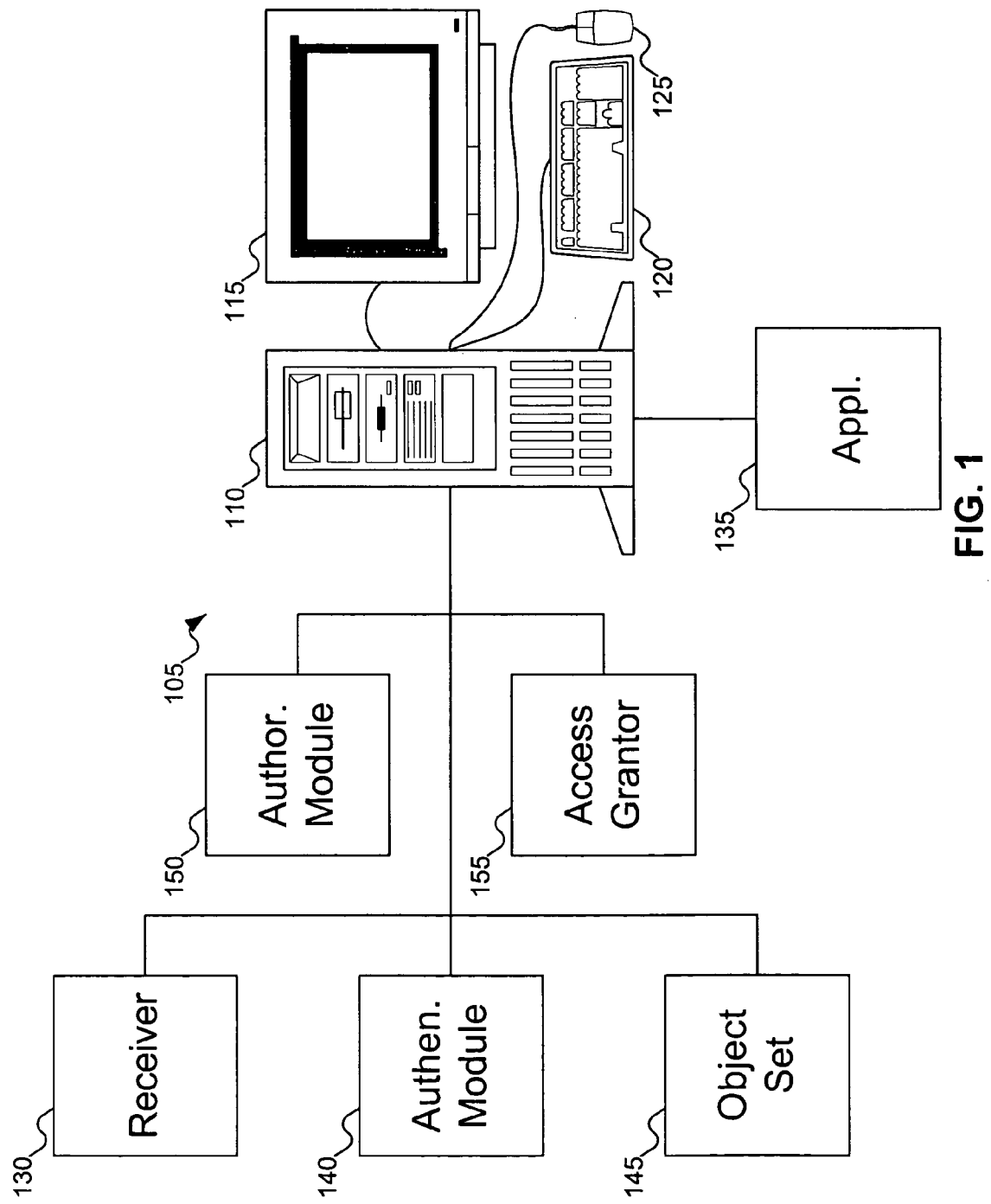
FIG. 1 shows a machine equipped to provide application-level control to applications, according to an embodiment of the invention.

FIG. 1 shows a machine equipped to provide application-level control to applications, according to an embodiment of the invention. FIG. 1 shows a machine equipped to provide access to applications, according to an embodiment of the invention. In FIG. 1, machine 105 is shown as including computer 110, monitor 115, keyboard 120, and mouse 125. A person skilled in the art will recognize that other components can be included with machine 105: for example, other input/output devices, such as a printer. In addition, FIG. 1 does not show some of the conventional internal components of machine 105; for example, a central processing unit, memory, etc.

Receiver 130 is responsible for receiving a request from a request the user to access an application, such as application 135. Such access is typically a request to execute an application, but a person skilled in the art will recognize that the user might be making some other type of request: for example, to modify a data file that supports execution of the application. Application 135 can be any application, but typically, application 135 is an alternative way to access machine 105 without completely logging in to machine 105.

Authentication module 140 is responsible for authenticating the user. Authentication can be performed using any desired authentication technique, and any desired authentication system. For example, authentication can be performed using, among other alternatives, Lightweight Directory Access Protocol (LDAP): for example, with a Linux® operating system User Management (LUM) module. (Linux is a registered trademark of Linus Torvalds.) In a Linux operating system, the authentication module often uses a Pluggable Access Module (PAM), with which LDAP and/or LUM can be used.

Figure 2:
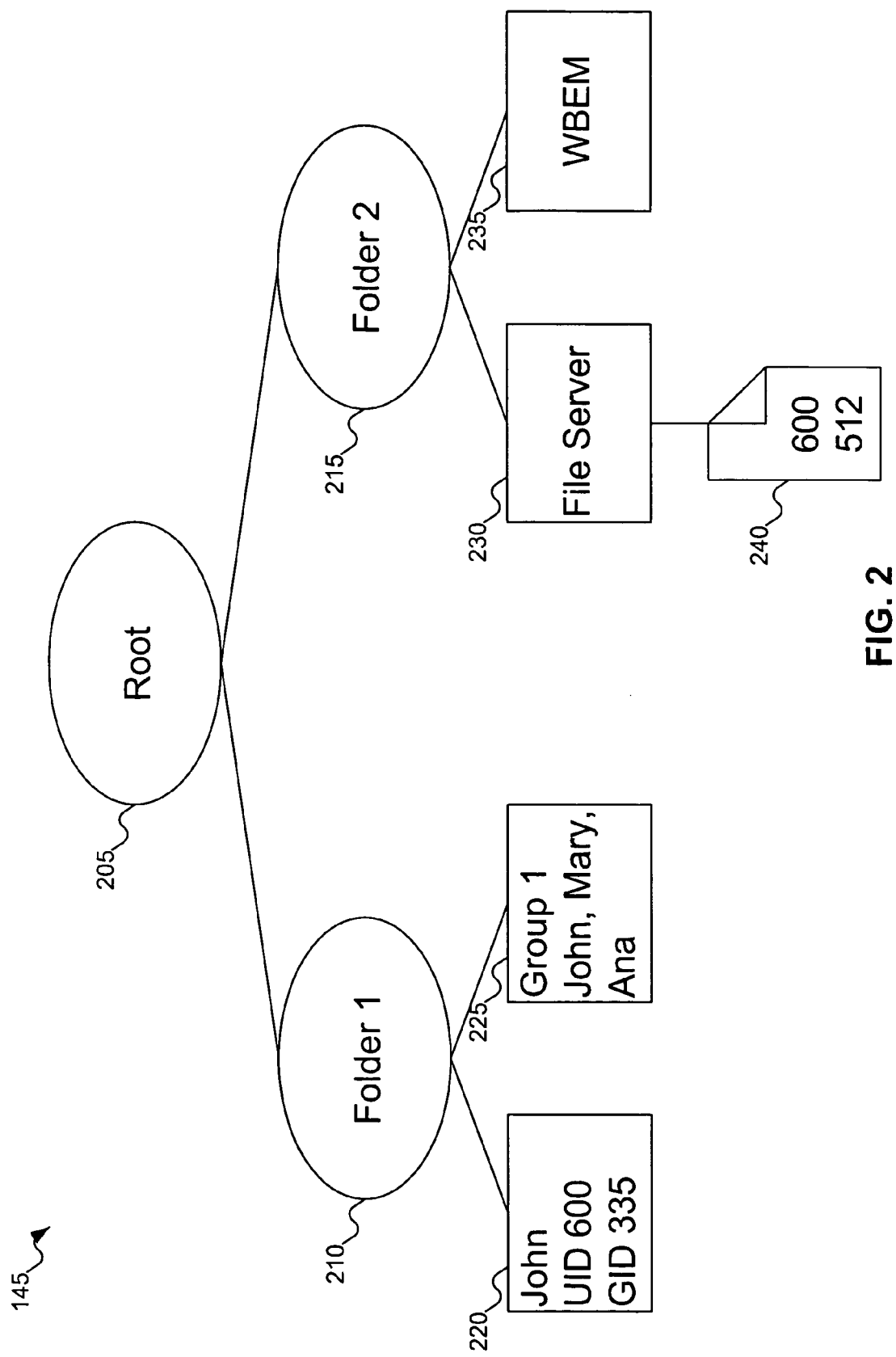
FIG. 2 shows the object set of FIG. 1 constructed as a container hierarchy, the object set indicating which applications a user can execute as an administrator, according to an embodiment of the invention.

To support authentication, object set 145 is used. Object set 145 stores information about users and applications (among other resources that can be represented by objects within object set 145). Object set 145 can be configured in several different ways. One configuration uses a container hierarchy. As shown in FIG. 2, object set 145 includes multiple containers. In FIG. 2, root container 205 includes two sub-containers:

container 210 and container 215. In FIG. 2, container 210 is shown as including user object 220 and group object 225, and container 215 is shown as including application objects 230 and 235.

Although FIG. 2 shows only two containers, a person skilled in the art will recognize that there can be any number of containers, and they can be in any configuration. For example, within, say, container 210 there can be another container, in which case the containers are said to be nested. In addition, a container can store objects of any type, containers simply being one type of object. Thus, a single container can store a nested container alongside user objects, application objects, and any other varieties of object.

User object 220 stores information about a particular user. User object 220, among other data, stores the user's name ("John"), his user ID (IAD "600") and his group ID (GID "335"). The UID is a unique ID assigned to the user by the system, and is different from any ID assigned to other users. The GID is a way to group users, and is not necessarily unique to each user. In addition, user object 220 can store authentication information, such as the user's password, although authentication is usually handled by authenticator 140 in FIG. 1. While FIG. 2 only shows a single user object 220, a person skilled in the art will recognize that there can be any number of user objects within object set 145.

Although user object 220 can store a GID, there can be more than one group to which the user belongs. The GID provides one way to group together users that share some common computer-related element: for example, all users whose home directories lie within a common directory in the file system. Thus, for example, all employees that work in the sales department might have their home directories in a common location within the file system, and might have a common GID. But there are other ways to group together users, which might not have any significance to the computer system. For example, it might make sense to group together all sales managers. Since typically a user has only a single GID, the GID cannot typically be used to represent multiple groups to which the user belongs. Group object 225 provides this alternate way to group users. For example, group object 225 lists three users: John, Mary, and Ana. While FIG. 2 only shows a single group object 225, a person skilled in the art will recognize that there can be any number of group objects in object set 145.

Application object 230 is shown as including list 240. List 240 is a list of users who are to be granted or denied permission to execute the application represented by application object 230. (A person skilled in the art will recognize that the phrase "permission to execute the application" can be interpreted to mean "the ability to execute the application". In other words, "permission" refers to the user's ability to execute the application.) Whether users are granted or denied permission to execute the application depends on the structure of list 240. For example, list 240 can be a blacklist, identifying users that are to be denied permission to execute the application. Or, list 240 can be a whitelist, identifying the only users that are to be granted permission to execute the application. In addition, a person skilled in the art will recognize other ways to control user access to applications, beyond blacklists and whitelists.

List 240 can identify users in different ways. For example, list 240 is shown as including to IDs: 600 and 512. Assuming that GIDs and UIDs are relatively unique (that is, no GID is the same number as any UID), then list 240 can be a straightforward list of IDs that are to be granted or denied access. (Of course, if GIDs and UIDs are not relatively unique, then list 240 can be modified to store which IDs represent GIDs and which represent UIDs, to achieve the same result.) List can also store group names, to represent groups that are not identified by GIDs. For example, group object 225 is named "Group 1". If the name "Group 1" were included in list 240, then members of the group represented by group object 225 can be granted or denied permission to execute the application, without individually managing their UIDs. Depending on whether or not the appropriate ID is found in the list, the user can be granted or denied permission to execute the application, as appropriate.

As an example, assume that list 240 represents a blacklist. That is, any user who is represented within list 240 is to be denied permission to execute the application. In addition, to simplify matters, assume that GIDs and UIDs are relatively unique (that is, no number is both a UID for some user and a GID for some group). This last assumption means that ID 600 must identify UID 600, which identifies the user named John. Since John's UID is in list 240, John is to be denied permission to execute the application.

Given that there are many different ways to identify users (through their UIDs, through their GIDs, and through their group memberships), the question arises how to handle these many different ways to identify users. One way to handle this situation is to treat a user as being on the list if any way to identify the user is on the list. Thus, even if a particular user were not include by UID, if their GID was on the list, or if a group to which they belong were on the list, then the user would be treated as if their UID were on the list. Thus, GIDs and groups can be thought of as shorthand representations of the lists of users that share those GIDs and groups.

Although FIG. 2 only shows one list associated with application object 230, a person skilled in the art will recognize that there can be multiple lists, and that these multiple lists can represent different information about the application. For example, while list 240 might be a blacklist, permission to execute the application object 230 might also have a whitelist associated with it. In that situation, there needs to be a way to prioritize among the lists, to prevent conflicts from arising. For example, what if a user is blacklisted by UID, by whitelisted by a group membership: which list takes priority? This prioritization can be accomplished using any desired approach. For example, one list can take priority over another list. Or the specificity level used to identify the user can take priority (for example, a list identifying a user by UID can trump a list identifying a user by GID or group membership). A person skilled in the art will recognize other ways in which prioritization can be handled. Of course, the safest approach is to avoid any conflicts, by making sure that a user is represented on only one list at a time. Since list modification is typically an administrative task, responsibility for avoiding conflicts of this type typically lies with the administrative users. A person skilled in the art will also recognize how tools can be constructed that identify conflicts when they are created. Such tools would not only watch for list modification, but also for modification of GIDs and group memberships, both of which can indirectly create conflicts.

Returning to FIG. 1, authorization module 150 is responsible for authorizing a user to execute the application. As discussed above with reference to FIG. 2, information about which users are to be granted or denied permission to execute the application can be stored in object set 145. Authorization module 150 uses this information to determine whether a user is authorized to execute the application. Authorization module 150 determines the application to which the user desired access (e.g., the name or some other identifier of the application), determines the identifier(s) of the user, accesses the application object from object set 150, and uses the appropriate list (or other structure) to determine whether the user is authorized to execute the application. Finally, access grantor 155 is responsible for deciding whether to grant the user permission to execute the application. This decision factors in whether the user is authenticated, and whether the user is authorized to execute the application.

In one embodiment, machine 105 includes a variant of the Linux® operating system. Thus, application 135 would be an application that runs under the Linux operating system. But a person skilled in the art will recognize that embodiments of the invention can be implemented to support other operating systems, provided the other operating systems can support access control to the applications in addition to user authentication.

Figure 3:
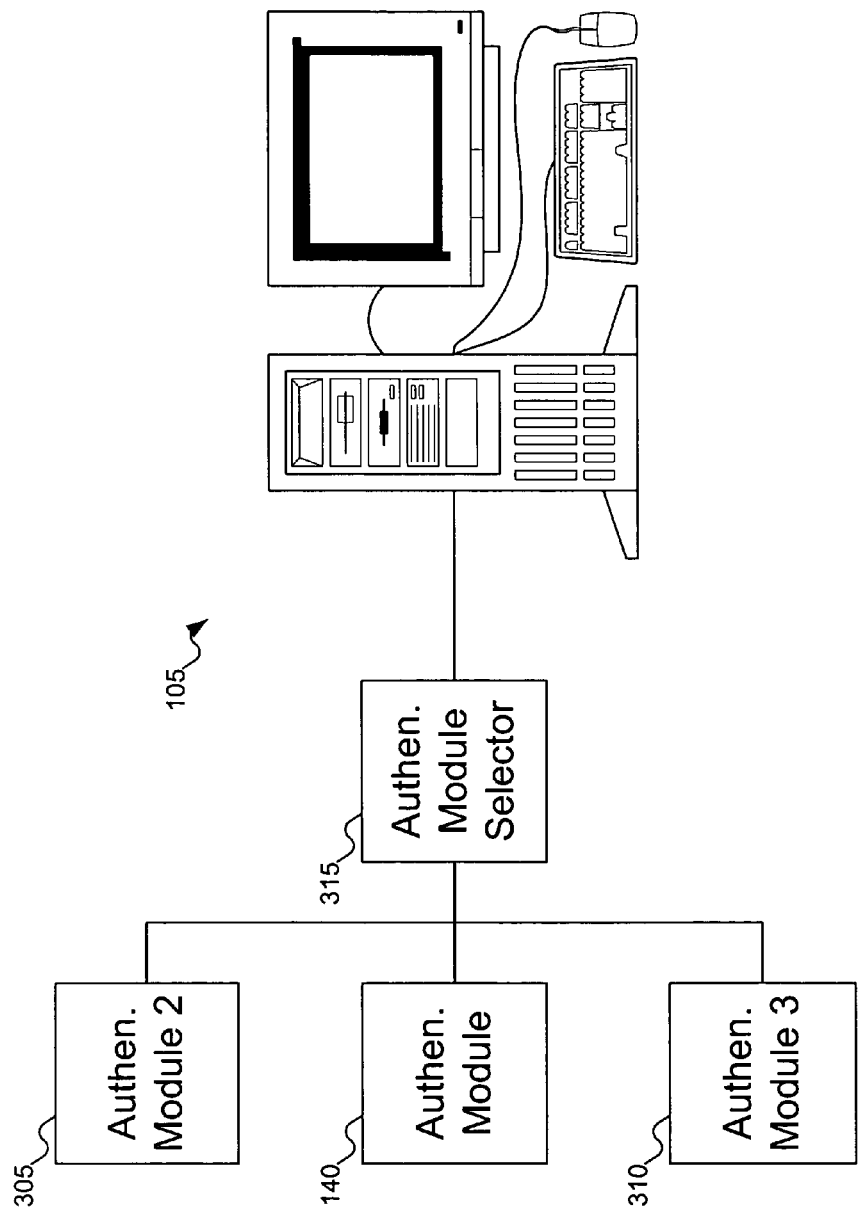
FIG. 3 shows the machine of FIG. 1 equipped to select an appropriate authentication module based on the application the user has requested to access, according to an embodiment of the invention.

FIG. 3 shows the machine of FIG. 1 equipped to select an appropriate authentication module based on the application the user has requested to access, according to an embodiment of the invention. In the embodiment shown in FIG. 3, multiple authentication modules 140, 305, and 310 are shown. Machine 105 also includes authentication module selector 315. Authentication module selector 315 uses information about the application to select the appropriate authentication module. For example, different applications might use different authentication modules to perform authentication. This information can be stored within the object set: for example, as data within the object representing the application. Thus, authentication module 140 might be used for requests to access a file server (such as might be represented by file server object 230 of FIG. 2), whereas authentication module 305 might be used for authentication requests to access a web based enterprise management (WBEM) server (such as might be represented by WBEM object 235 of FIG. 2).

Figure 4A:
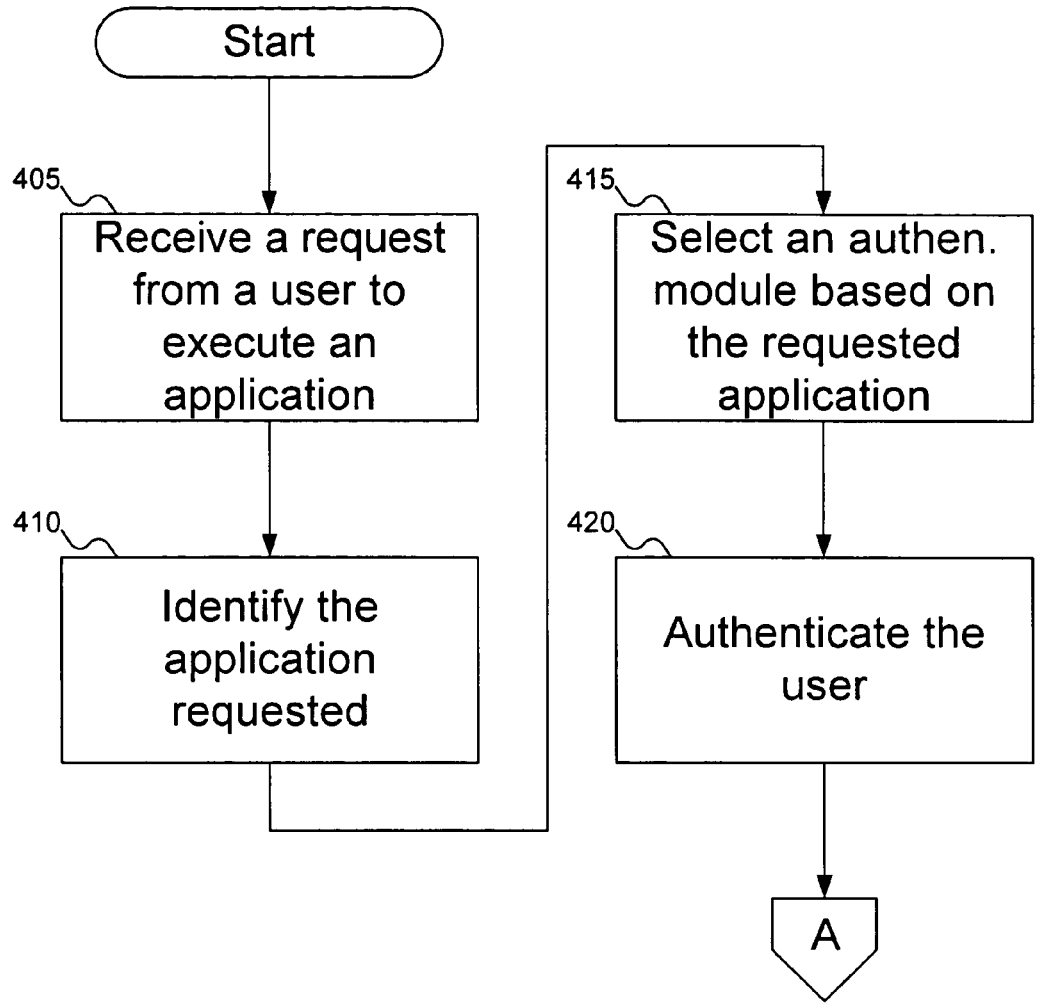
FIGS. 4A-4B show a flowchart of the procedure used by the machine of FIG. 1 to authenticate users and verify that they are authorized to execute the application, according to an embodiment of the invention.
Figure 4B:
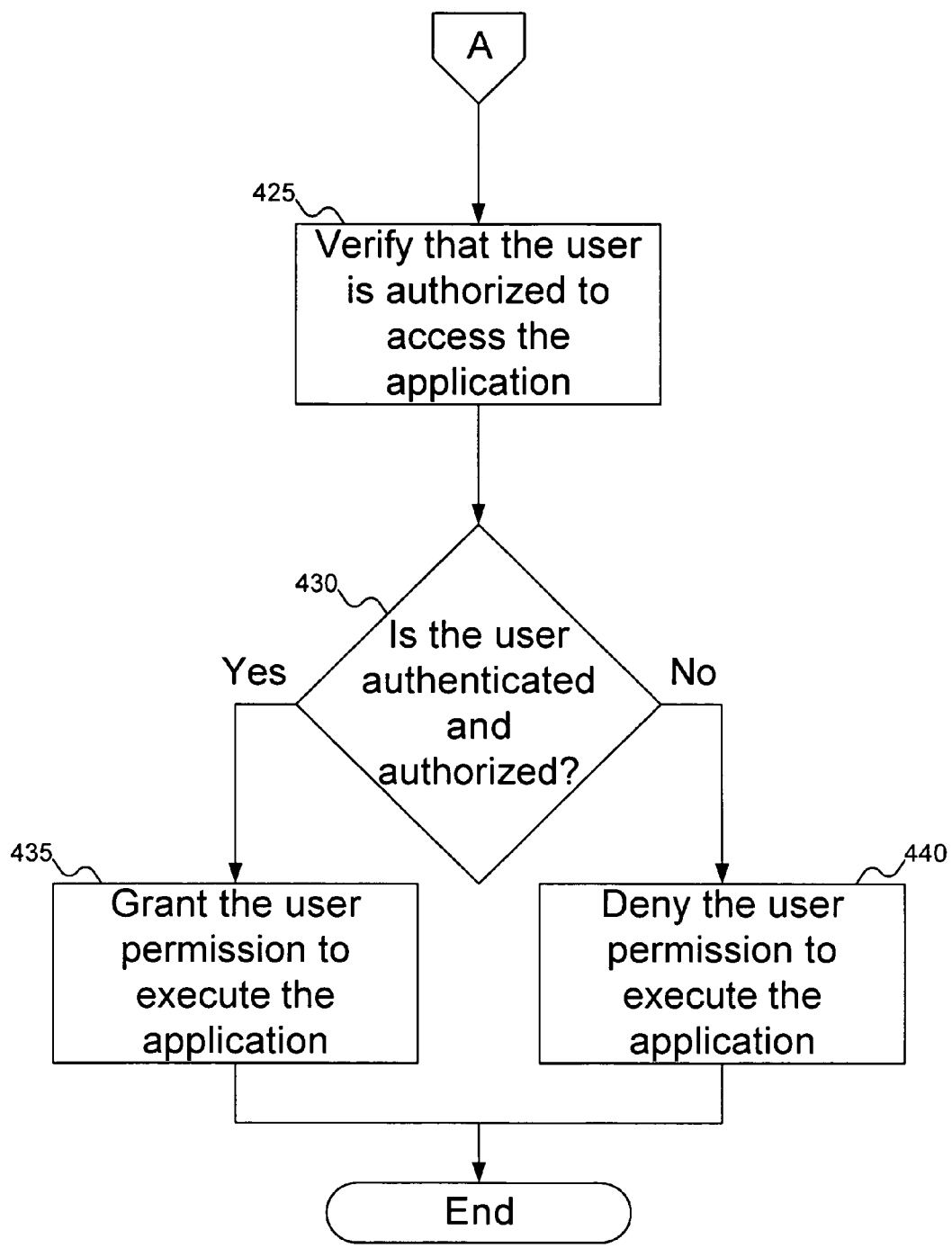

FIGS. 4A-4B show a flowchart of the procedure used by the machine of FIG. 1 to authenticate users and verify that they are authorized to execute the application, according to an embodiment of the invention. In FIG. 4A, at step 405, the system receives a request from a user to execute the application. At step 410, the system identifies the application requested, so that at step 415, the system can select the authentication module appropriate for the application. At step 420, the system attempts to authenticate the user.

At step 425 (FIG. 4B), the system verifies that the user is authorized to execute the application. At step 430, the system determines whether the user is both authenticated and authorized to execute the application. If the user is both authenticated and authorized, then at step 435 the system grants the user permission to execute the application; otherwise, the system denies the user permission to execute the application.

Figure 5A:
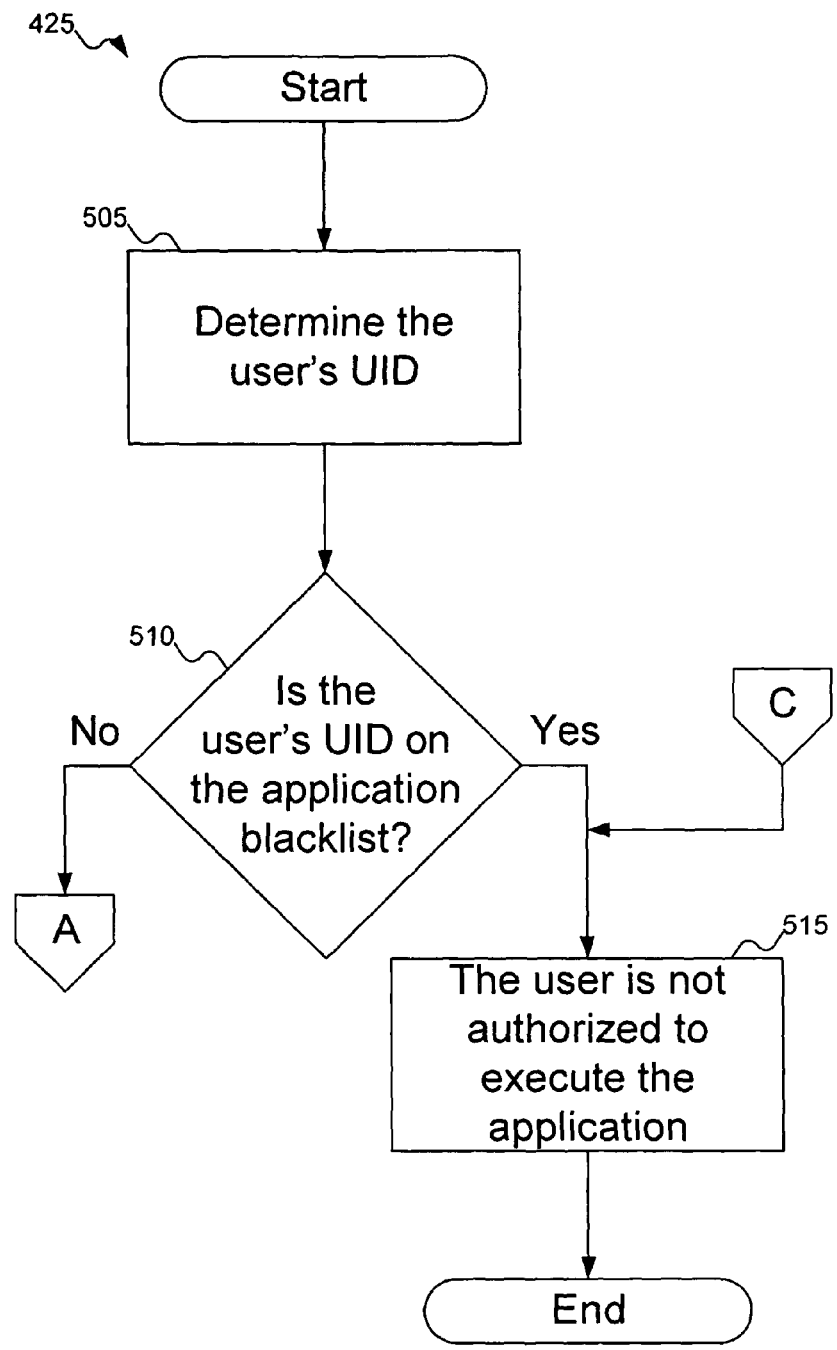
FIGS. 5A-5C show a flowchart of the procedure used by the machine of FIG. 1 to determine whether a user is authorized to execute the application, according to an embodiment of the invention.
Figure 5B:
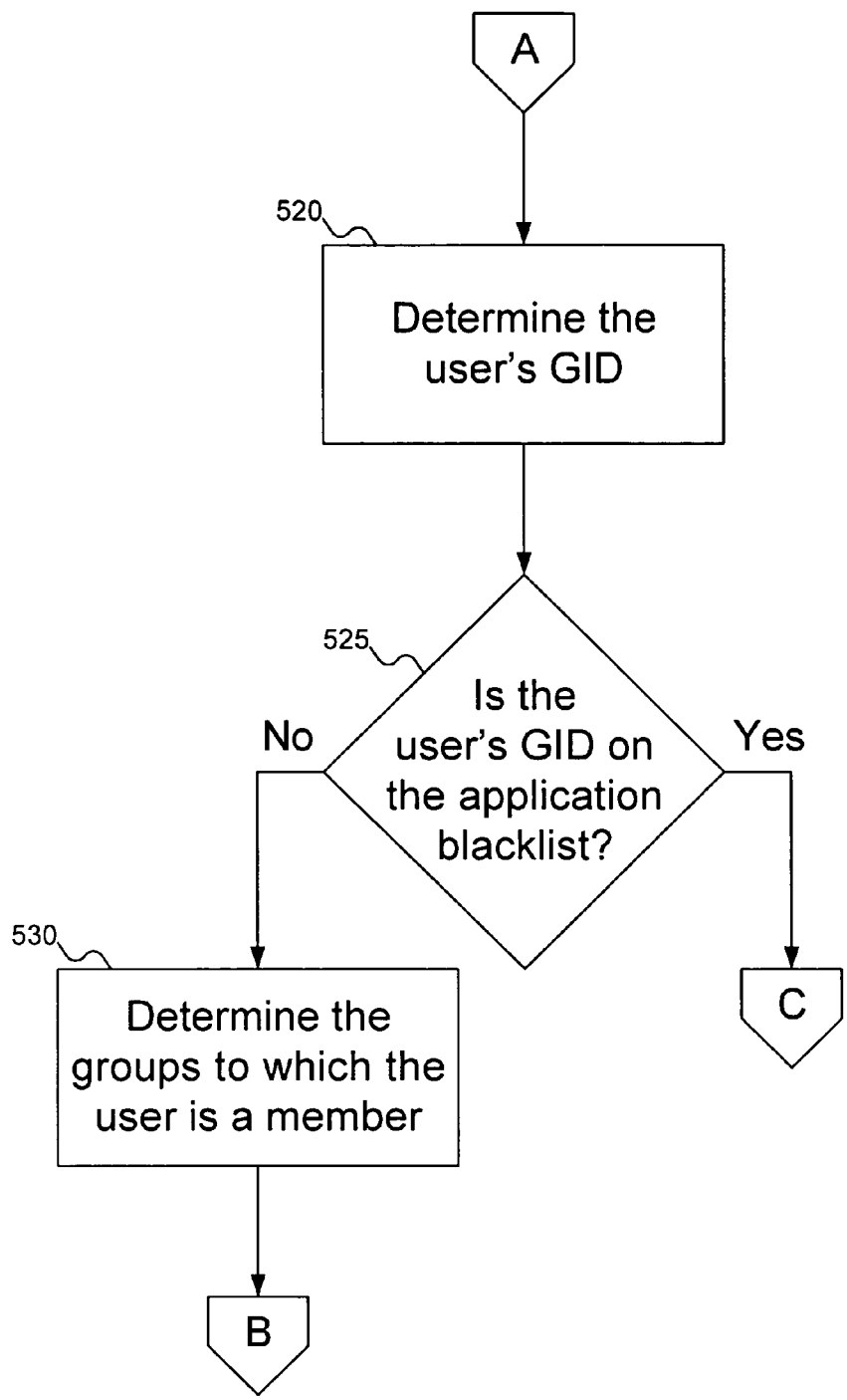
Figure 5C:
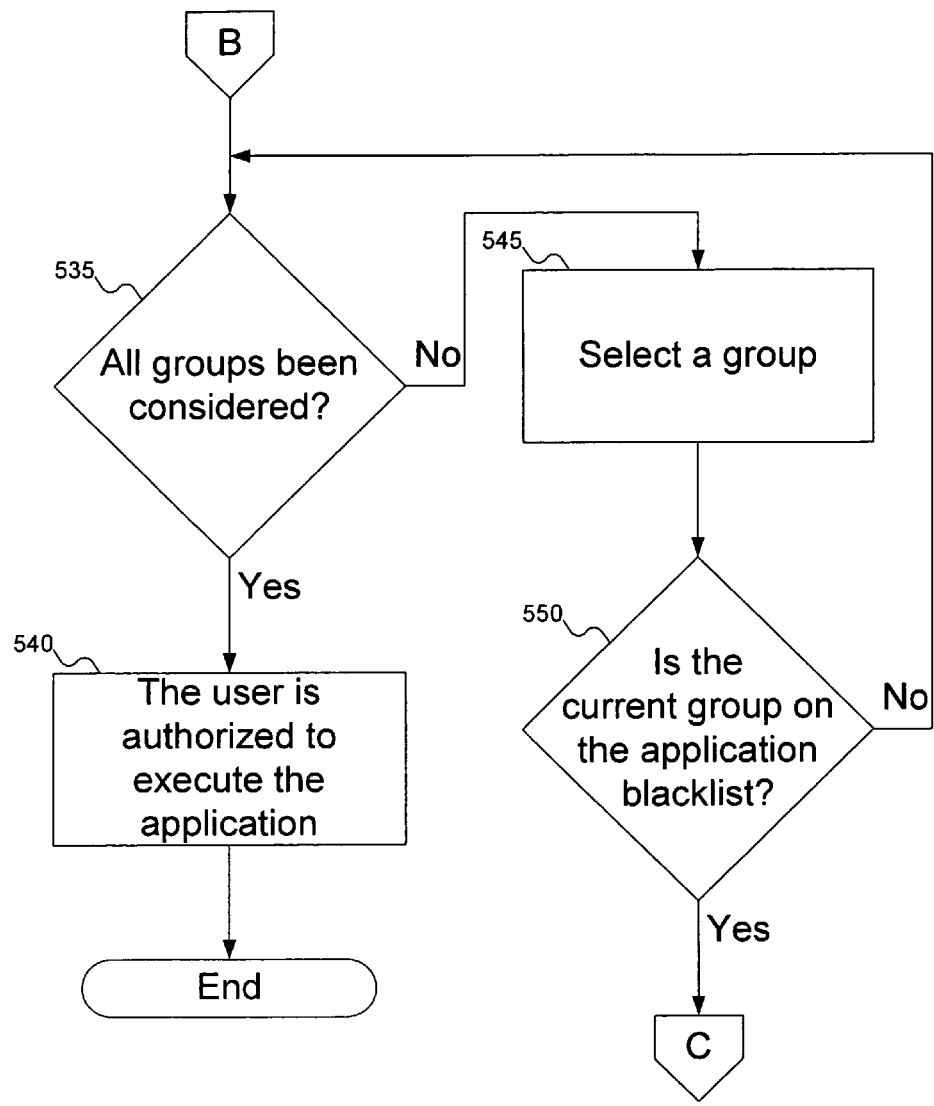

One important point in the flowchart shown in FIGS. 4A-4B is how the system determines whether the user is authorized to execute the application. FIGS. 5A-5C show a flowchart of the procedure used by the machine of FIG. 1 to determine whether a user is authorized to execute the application, according to an embodiment of the invention. In the embodiment shown in FIGS. 5A-5C, the system uses a blacklist to determine which users are to be denied permission to execute the application, but a person skilled in the art will recognize how the system can be modified to support whitelists or other authorization structures.

In FIG. 5A, at step 505, the system determines the user's UID. At step 510, the system determines whether the user's UID is on the blacklist. If the user is blacklisted, then at step 515 the system has determined that the user is to be denied permission to execute the application. Otherwise, at step 520 (FIG. 5B), the system determines the user's GID, and at step 525 the system determines whether the user's GID is on the blacklist. If the user is blacklisted, then processing returns to step 515, and the system has determined that the user is to be denied permission to execute the application.

If neither the user's UID nor GID are blacklisted, then at step 530 the system determines the groups to which the user is a member. At step 535 (FIG. 5C), the checks to see if all groups to which the user is a member have been checked. If all groups have been checked, then at step 540 the system determines that the user is authorized to execute the application. Otherwise, at step 545, the system selects a group, and at step 550 checks to see if the group's name is on the blacklist. If the current group is blacklisted, then processing returns to step 515, and the system has determined that the user is to be denied access permission to execute the application. Otherwise, processing returns to step 535 to check for other groups to which the user is a member.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth® wireless technology, optical, infrared, cable, laser, etc. (The Bluetooth word mark is a registered trademark of the Bluetooth SIG, Inc.)

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   an application including an application name;
   a receiver to receive a request from a user to execute the application;
   a plurality of authentication modules to authenticate the user responsive to the request from the user to execute the application, each of the plurality of authentication modules capable of authenticating the user by themselves;
   an authentication module selector to select an authentication module using the application name, the authentication module separate from each of the plurality of authentication modules;
   an object set, including at least a first object representing the user and a second object including an indication as to whether the user is authorized to execute the application, the indication as to whether the user is authorized to execute the application includes a blacklist of IDs to be denied permission to execute the application and the first object includes a user ID (UID), wherein the UID is a unique ID assigned to the user by the system different from any ID assigned to other users; and
   an authorization module to determine whether the UID is included in the blacklist of IDs.

2. An apparatus according to claim 1, further comprising an access grantor to grant the user permission to execute the application if the user is authenticated by the selected authentication module and is authorized by the authorization module.

3. An apparatus according to claim 2, wherein the access grantor is to deny the user permission to execute the application if the user is not authenticated by the selected authentication module and authorized by the authorization module.

4. An apparatus according to claim 1, wherein:
   the first object further includes a group ID (GID); and
   the authorization module is further to determine whether the GID is included in the blacklist of IDs.

5. An apparatus according to claim 1, wherein:
   the object set further includes a group object, the group object identifying a grouping of users and including a group name, the grouping of users including the user; and
   the authorization module is further to determine whether the group name is included is in the blacklist of IDs.

6. An apparatus according to claim 1, wherein the application is designed to run on an operating system from LINUX.

7. A method, comprising:
   receiving a request from a user to execute an application;
   authenticating the user responsive to the request from the user to execute the application, including:
      selecting an authentication module from a plurality of authentication modules using a name of the application, each of the plurality of authentication modules capable of authenticating the user by themselves; and
      using the selected authentication module to authenticate the user; and
   verifying that the user is authorized to execute the application using an authorization module, the authentication module separate from each of the plurality of authentication modules, including:
      accessing an object set, the object set including at least a first object representing the user and a second object including an indication as to whether the user is authorized to execute the application, the indication as to whether the user is authorized to execute the application including a blacklist for the application;
      determining a user ID (UID) for the user from the first object in the object set, wherein the UID is a unique ID assigned to the user by the system different from any ID assigned to other users;
      determining if the UID is on the blacklist; and
      if the UID is not on the blacklist for the application, indicating that the user is authorized to execute the application.

8. A method according to claim 7, further comprising, if the user is authorized to execute the application and is authenticated, granting the user permission to execute the application.

9. A method according to claim 7, further comprising, if the user is not authorized to execute the application or is not authenticated using the selected authentication module, denying the user permission to execute the application.

10. A method according to claim 7, wherein determining whether the user is on a blacklist further includes:
    determining a group ID (GID) for the user from the first object in the object set; and
    determining if the GID is on the blacklist.

11. A method according to claim 7, wherein determining whether the user is on a blacklist includes:
    determining a group to which the user belongs, the group represented by a group object in the object set; and
    determining if the group is on the blacklist.

12. An article, comprising:
    a non-transitory storage medium, said non-transitory storage medium having stored thereon instructions, that, when executed by a machine, result in:
    receiving a request from a user to execute an application;
    authenticating the user responsive to the request from the user to execute the application, including:
       selecting an authentication module from a plurality of authentication modules using a name of the application, each of the plurality of authentication modules capable of authenticating the user by themselves; and
       using the selected authentication module to authenticate the user; and
    verifying that the user is authorized to execute the application using an authorization module, the authentication module separate from each of the plurality of authentication modules, including:
       accessing an object set, the object set including at least a first object representing the user and a second object including an indication as to whether the user is authorized to execute the application, the indication as to whether the user is authorized to execute the application including a blacklist for the application;

determining a user ID (UID) for the user from the first object in the object set, wherein the UID is a unique ID assigned to the user by the system different from any ID assigned to other users;

determining if the UID is on the blacklist; and if the UID is not on the blacklist for the application, indicating that the user is authorized to execute the application.

13. An article according to claim 12, wherein the non-transitory storage medium has further instructions stored thereon that, when executed by the machine result in, if the user is authorized to execute the application and is authenticated, granting the user permission to execute the application.

14. An article according to claim 12, wherein the non-transitory storage medium has further instructions stored thereon that, when executed by the machine result in, if the user is not authorized to execute the application or is not authenticated using the selected authentication module, denying the user permission to execute the application.

15. An article according to claim 12, wherein determining whether the user is on a blacklist further includes:

determining a group ID (GID) for the user from the first object in the object set; and determining if the GID is on the blacklist.

16. An article according to claim 12, wherein determining whether the user is on a blacklist includes:

determining a group to which the user belongs, the group represented by a group object in the object set; and determining if the group is on the blacklist.

17. An apparatus according to claim 1, the object set further includes a third object including a second indication as to whether the user is authorized to execute a second application, wherein a first of the indication and the second indication can grant the user access to a first of the application and the second application as though the user were an administrative user, and a second of the indication and the second indication can grant the user access to a second of the application and the second application as though the user were a limited user.

18. A method according to claim 7, wherein accessing an object set includes accessing the object set, the object set further including a third object including a second indication as to whether the user is authorized to execute a second application, a first of the indication and the second indication indicating that the user can access a first of the application and the second application as though the user were an administrative user, and a second of the indication and the second indication indicating that the user can access a second of the application and the second application as though the user were a limited user.

19. An article according to claim 12, wherein accessing an object set includes accessing the object set, the object set further including a third object including a second indication as to whether the user is authorized to execute a second application, a first of the indication and the second indication indicating that the user can access a first of the application and the second application as though the user were an administrative user, and a second of the indication and the second indication indicating that the user can access a second of the application and the second application as though the user were a limited user.

* * * * *